3,508,822
Patented Apr. 28, 1970

3,508,822
PROJECTION SYSTEM
William D. Cornell, Grand Haven, and Michael G. Gautraud and Anthony J. Gretzky, Muskegon, Mich., assignors to Brunswick Corporation, a corporation of Delaware
Filed Feb. 1, 1967, Ser. No. 613,352
Int. Cl. G03b 21/132, 21/28
U.S. Cl. 353—69                                                                                                             9 Claims

ABSTRACT OF THE DISCLOSURE

A projection system for a continuously changing legend such as bowling scores wherein the sources of the image is on a face of a prism which when utilized in an optical system gives rise to distortion error which is corrected in part by added glass on the prism and in part by a tilted lens in a manner such that distortion is held to acceptable levels. In order to elevate the image above the heads of persons of average height, the system includes a relay lens, and the image of the filament of the light source is reproduced adjacent the center of one or more lenses in order to not appear in the image as projected onto a screen. The prism is covered with a protective glass plate at the printing surface.

BACKGROUND OF THE INVENTION

This invention relates to improvements in projection systems and especially those systems which employ an internally reflecting surface as the image source. This invention more particularly relates to projection systems which are useful in projecting bowling scores in a bowling establishment.

In view of recent developments in providing operative systems for automatically scoring bowling games and systems for printing bowling scores responsive to such automatic scoring, more and more attention has been directed to the development of acceptable projection systems for projecting the printed bowling score information. The projection system should be capable of projecting the bowling score information to a viewing screen to which reference may be made by bowlers and spectators for a given bowler's score status at any time during the game. Many projection systems permit an undesirable image of the printing means to be projected along with the printed image on a scoresheet. For this reason prism projectors have been developed utilizing an internally reflecting surface of a platen, such as a generally right-angle prism, as the image source.

A prism projector is disclosed in Donald E. Roop Patent 3,249,002, issued May 3, 1966, entitled "Bowling Score Projector," in which the internally reflecting surface of a triangular prism receives the image to be projected. The image is placed on the internally reflecting surface by destroying reflectivity of the surface such as by marking the surface with a nonreflective material. Light is directed into a second surface of the prism, reflected from the internally reflecting surface, and exists through the third surface of the prism. The image is picked up by the light at the internally reflecting surface and is projected to a viewing screen.

The prism projectors exclude any image of the printing means, and the image directed to a viewing screen are acceptable. However, where a higher degree of excellence is desired, it has been found that the system should be corrected to remove depth-of-field error.

One system for correcting the depth-of-field error is described by Joseph L. Byrd and Paul G. Andrus in Patent 3,269,258, issued Aug. 30, 1966, entitled "Means for Correcting Depth-of-Field Error in a Projection System." The Byrd et al. proposal is to add a sufficient thickness of light-transmitting material between the exit surface of the prism and the viewing screen for the purpose of bringing the apparent image more clearly into complete focus by the projection lens. In a specific system described, the projection prism includes additioinal prism material at the exit surface. However, it was found that where illumination was increased to provide a bright image on the screen and where the error correction system of Byrd et al. was used to totally correct depth-of-field error, astigmatism was introduced into the projected image, i.e. where the image was focused to clearly show and darken vertical lines, the horizontal lines were not clearly and fully reproduced, and where the horizontal lines were properly focused, the vertical lines were not properly reproduced.

SUMMARY OF THE INVENTION

It is a general object of this invention to provide a new and useful error correction system which eliminates unwanted astigmatism. It is a further object of this invention to provide a projection system including a platen having an internally reflecting surface for receiving an image where depth-of-field error is partially corrected in a first manner to a level at which appreciable astigmatism is not present in the projected image and in which the depth-of-field error is further corrected in a manner which does not introduce additional astigmation.

Still another object of this invention is to provide correction means in a system of the type described including added glass varying in thickness across the plane of the image to bring the apparently more distant portions of the apparent image sufficiently closer to the projection lens to partially eliminate depth-of-field error but not sufficiently near to the projection lens to introduce appreciable astigmatism, and including additional error correction means in the form of a light-transmitting lens disposed at an angle across the light path between the first mentioned error correction means and the viewing screen to further correct depth-of-field error without intoducing additional astigmatism.

Also, the prism projector system normally includes a number of mirrors to direct the image and correctly orient the image on the viewing screen. Since mirrors are not 100 percent efficient, a loss of illumination is suffered at each surface. The projection system, of course, also may include a plurality of lenses, and each lens surface introduces additional light losses. The points of light loss are so numerous in a normal system that the light transmitted for illuminating the screen image is only a small percentage of the initial illumination provided by the light source.

Another object is to provide a projection system according to any of the foregoing objects in which a viewing screen can be adequately illuminated without unduly increasing the size of the light source used in the projection system.

It also has been found that prism projection systems of the type described may project an objectionable image of a filament of the light source onto the viewing screen, and it is an object of this invention to provide a projection system which is modified to eliminate such filament image.

In addition, where prisms are used as platens in such projection systems, it has been found that the prisms may be chipped, cracked, scratched, or otherwise marred, by a printer used to impress the image on the prism surface, thereby subjecting valuable prism elements to abuse; and it is an object of this invention to protect such prism elements from damage.

It is a further object of this invention to provide a new and useful prism combination which includes a triangular prism of plastic, optical glass, or other light-transmitting material, and which further includes a protective light-transmitting plate which is secured in surface-to-surface contact with a surface of the prism and defines the internally reflecting surface of the projection system.

Other objects of this invention will be apparent to those in the art from the following description and the drawings.

Figure 1:
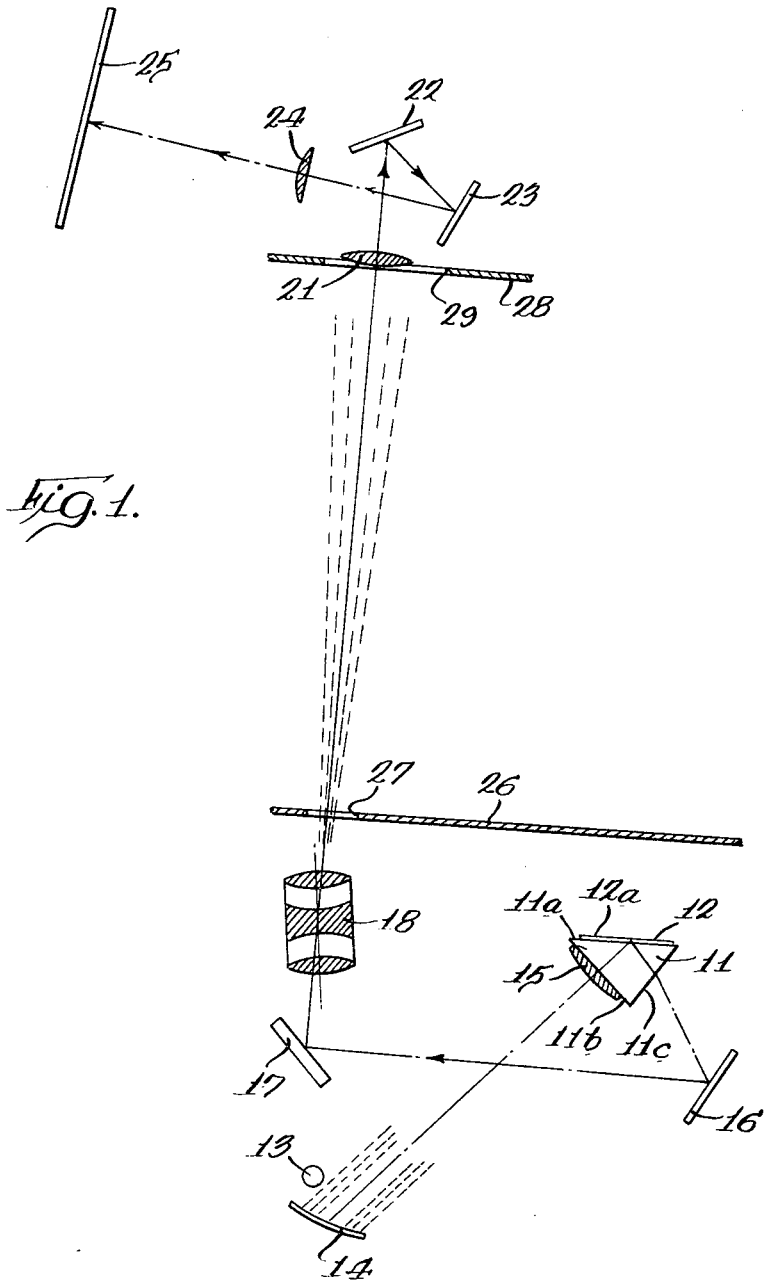
FIG. 1 is a diagrammatic view of a form of projection system showing the disposition of the various elements relative to each other.

While this invention is susceptible of embodiment in many different forms, there is shown in the drawings and will herein be described in detail a specific embodiment of the invention with the understanding that the present disclosure is to be considered as an exemplification of the principles of the invention and is not intended to limit the invention to the embodiment illustrated.

DESCRIPTION OF THE PREFERRED EMBODIMENT

It is contemplated that the projection system of the present invention can be utilized in association with one or more bowling lanes, e.g. by placement at the bowler's end of a bowling lane or plurality of adjacent bowling lanes, and that such bowling lane or bowling lanes may be equipped with automatic pinsetting and ball return equipment of conventional design and other equipment as may be desired.

Turning first to FIG. 1, the form of projection system illustrated includes a triangular prism 11 having a transparent protective plate 12 secured to one surface 11a of the prism 11 and in effect extends the prism to surface 12a of plate 12. The plate may comprise common unground glass such as window glass having a relatively low index of refraction on the order of 1.5. A light bulb 13 is provided as a light source, and a paraboloidal mirror 14 is correctly positioned for directing light as a parallel beam to the prism 11 and plate 12. On the entry surface 11b of prism 11, there is secured a condensing lens 15 for condensing the light entering the prism. The light passes through condensing lens 15, prism 11 and plate 12, and is reflected at internally reflective surface 12a of plate 12, back through plate 12 and prism 11, and the reflected light exits through exit surface 11c of prism 11. The exiting light carries the image and is reflected by a pair of planar mirrors 16 and 17 through a relay lens 18 and a field lens 21, and is then redirected by a pair of planar mirrors 22 and 23 through a projection lens 24 which projects the image to a viewing screen 25.

Glass plate 12 is cemented to surface 11a of prism 11 with an optically clear lens cement, and has a permanent image of a scoresheet screened and fired on surface 12a in a vitreous enamel. In event of damage to plate 12, it may be removable from prism 11 by destroying the bond of the cement so that the relatively expensive prism 11 can be reused by bonding on a new glass scoresheet plate.

It will be apparent to those in the art that the various elements illustrated in FIG. 1 can be readily mounted by suitable mounting means in a console or the like, such as is described in U.S. Patent 3,269,258. The console preferably includes an upper housing supported by a suitable post or other support structure from a lower housing. In FIG. 1 the upper wall of the lower housing is indicated at 26 and the lower wall of the upper housing is indicated at 28. Wall 26 has a port 27 through which the relay lens 18 projects the image to the field lens 21 which receives the image through a port 29 in wall 28. Relay lens 18 is mounted with its optical axis at an angle of about 7 to 8 degrees to the light passing through the lens, as seen in FIG. 1 and as will be more particularly described hereinbelow.

For a fuller description of the correction of depth-of-field error by increasing the glass at the exit surface of a prism, the above-identified U.S. Patent 3,269,258 is hereby incorporated herein by reference.

Figure 2:
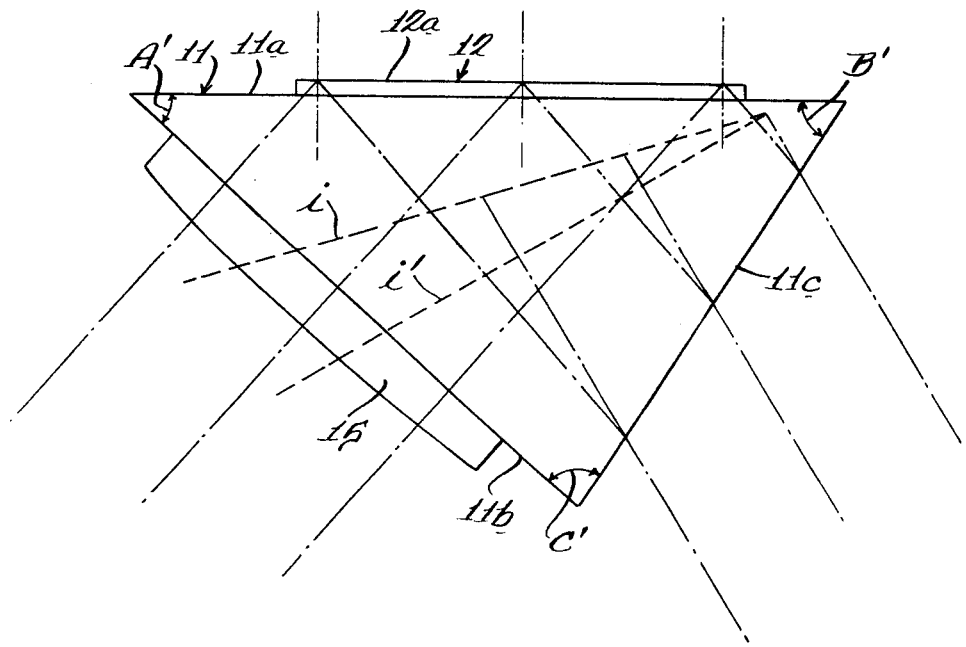
FIG. 2 is an enlarged side view of the prism of the system of FIG. 1.

FIG. 2 illustrates the platen, including prism 11 and glass plate 12, of the projection system of FIG. 1 showing the relation of the surfaces 11a–11c relative to each other and the angle between these surfaces. For clearer understanding, comparison will be made with the system of Byrd et al. In that system the additional glass at the exit surface of the prism was sufficient to rotate the apparent image within the prism to a position sufficiently normal to the beam of light exiting the prism for the projection lens to focus the entire image on a planar surface, i.e. the viewing screen. In the Byrd et al. patent, the angles of the prism used are identified as angles A, B and C, and the corresponding angles of the prism of this invention in FIG. 2 are identified as A', B' and C', respectively. In the Byrd et al. patent and in the present invention, the angles A and A' are sufficiently large to assure reflection of light from the internally reflecting surface 12a, and angle A' is therefore preferably larger than the critical angle of reflection at surface 12a. In the Byrd et al. system, the angle B is related to angle A by the following expression:

$$\tan B = \frac{X^2 \tan A}{X^2 - 1 - \tan^2 A}$$

wherein X is the refractive index of the prism material.

In the present invention, the angle B' is sufficiently less than angle B of the above formula to prevent introduction of appreciable astigmatism. Usually angle B' will be from 5 to 25 degrees less than the angle B of the above formula. In the particular prism illustrated in FIG. 2, where the index of refraction of the glass from which the prism was made is 1.65, angle A' is 42 degrees, angle B' is 57 degrees, and angle C' is 81 degrees. The apparent image is pivoted by the extra glass adjacent exit surface 11c, provided by the greater size of angle B' compared with angle A', to a position shown by the dotted line indicated i in FIG. 2. It will be noted that the apparent image is not pivoted completely or even substantially normal to the exiting image-carrying beam as would be represented by an apparent image in a plane at i'. The angle of refraction of the light beam exiting surface 11c is only 15 degrees, which is insufficient to introduce appreciable astigmatism, even with the screen brightly illuminated.

Figure 3:
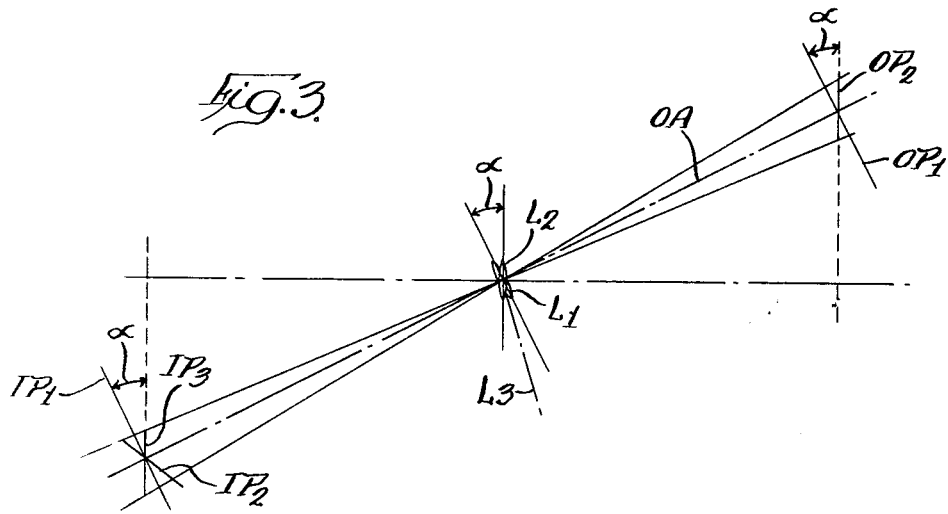
FIG. 3 is a diagrammatic showing which helps illustrate an effect obtained from the present invention.

Returning to FIG. 1, additional correction of depth-of-field error is accomplished by the angular disposition of one of the projection system lenses between the internally reflecting surface and the viewing screen. In the system shown, the relay lens 18 is disposed with its axis at an angle of about 7 to 8 degrees from the axis of the light beam. To better understand error correction by so tipping such a lens, attention is particularly directed to FIG. 3. In FIG. 3, assuming projection of an image from object plane OP–1 to form an image on an image plane IP–1 with the projection lens perpendicular to the optical axis of the light path as shown by lens $L_1$, the object, projection lens and image lie in planes all perpendicular to a common imaginary line, i.e. the optical axis, OA, of lens $L_1$. The center of the object and lens are usually placed on the optical axis to cause the center of the image to resolve on the optical axis.

Now assuming the object is moved at an angle, to optical axis OA, as shown at $OP_2$ in FIG. 3, the object plane no longer lies perpendicular to the optical axis and therefore is not parallel to the plane of the lens $L_1$. In such case, an image is formed which is also oblique to the optical axis but opposite in inclination, as seen at $IP_2$. This situation causes the image to be out of focus unless the screen on which the image is being projected is also oblique to the optical axis by about the same angular amount.

If the lens is tipped oblique to the optical axis OA, to the position of lens $L_2$ by the same amount and in the same direction as the object plane $OP_2$ and if the viewing screen were also tipped in the same direction by the same amount to the position of $IP_3$, each of the object $OP_2$ lens $L_2$ and image $IP_3$ planes are parallel to each other and all are oblique to the optical axis of the light path by approximately the same amount, i.e. by the angle $\alpha$ in FIG. 3. This produces the equivalent effect, with respect to depth-of-field, as having all three of these planes perpendicular to the optical axis of the lens.

In the system of the invention, the image source at $i$ corresponding to the object plane in FIG. 3 is oblique to the optical axis represented by the central line of the three exiting prism faces 11c in FIG. 2, while it is desirable to have the image plane perpendicular to the axis of the light beam, at least at the screen 25 and preferably at the lens 21. Accordingly, the lens 18 is tipped through an angle sufficient to rotate the projected image by an amount represented by the angle between dotted lines $i$ and $i'$ in FIG. 2 to a position more nearly perpendicular to the optical axis of the light path.

The amount of tipping necessary to achieve the desired result will vary depending on the amount of error correction already provided by the extra glass at the prism exit face, the distances involved, the obliqueness of the object, focal length, and the like. In the illustrated system using the illustrated prism, a tipping of 7 to 8 degrees away from the prism at the top of the lens is deemed optimum. In any system, the tipping is sufficient to further correct or eliminate depth-of-field error, as can be observed visually. This permits substantially complete depth-of-field error correction without introducing undesirable amounts of astigmatism.

More specifically, if the object plane $OP_2$ of FIG. 3 is visualized as the object plane of the image source $i$ at the prism, then by rotating the relay lens, which can be considered L in FIG. 3, part way between $L_1$ and $L_2$, to a position represented by center line $L_3$, the projected image plane will be part way between $IP_2$ and $IP_3$. In other words, since position $L_1$ causes image $IP_2$ when the object plane is $OP_2$, and position $L_2$ causes image $IP_3$ in order to square up the image plane with the optical axis as at $IP_1$, the angle of rotation will be about one-half of angle $\alpha$, which in the disclosed system is approximately 16 degrees. Hence the relay lens is rotated approximately 8 degrees.

The present system is further designed to conserve light so that the smallest possible filament or light source can be used in order to reduce the size of the optical components to values less than otherwise would be required. It will be understood that except for the prism and the paraboloidal mirror, the size of all of the optical elements, and therefore the cost, is dependent on the size of the light filament. Accordingly, the number of air-to-glass interfaces is kept at a minimum, as is the number of reflecting surfaces.

The light condensing system comprising paraboloidal mirror 14 and lens 15 projects a magnified image of the filament or light source, and field lens 21 relays that image. In the preferred form of the apparatus illustrated, the focal length of condensing lens 15 is selected to focus the magnified image of the bulb filament near the center of lens 18. Similarly, the focal length of the field lens 21 is selected to focus the reduced, relayed image of the filament near the center of lens 24, so that the images of the filament will not be projected to the viewing screen. Thus it will be seen that the size of the filament controls the size and cost of other elements of the system.

It is an advantage of the present system that the image of the bowling scoresheet can be projected upward from the lower housing of the console to an overhead position at the upper housing, which is about six feet above the floor in the illustrated embodiment, and thence horizontally to a projection screen. Directing the path of the image in this manner eliminates obstruction of the image by a person of normal height walking in front of the console. As another advantage, although the relay lens 18 functions, in effect, as a projection lens, the image is not magnified by the lens 18 but is merely relayed at the same size to the field lens 21. This provides a non-magnified image for transmission within the upper housing so that the field lens 21 and mirrors 22 and 23 can be smaller than would be possible if the image were enlarged during its projection from the lower housing. The image passes through projection lens 24 and is thereby magnified, ten to eleven times in the illustrated form, and projected on the screen 25. The smaller size field lens and mirrors in the upper housing reduces the over-all cost of the system.

Further, the present system advantageously provides a sufficiently magnified image at screen 25 which can readily be read by the participants or audience in a bowling contest, while still providing good resolution, decreased astigmatism and good illumination of the image on the screen. In the system illustrated, it was found that the resolution was about 50 lines/cm., i.e. 50 lines/cm. at surface 12a where clearly legible in the projected image at screen 25.

The loss of light in the optical system is greatly reduced by the illustrated arrangement so that the projected image is well illuminated. In transmission of an image, each mirror surface and each glass air interface, e.g. lens surface, reduces the amount of light being transmitted. Additionally, more light is lost where the light path impinges such surfaces at more acute or indirect angles. In the illustrated form, the reflecting surfaces and interfaces are reduced to a minimum and the reflecting surfaces are arranged for more direct light impingement. Additionally, the use of a paraboloidal mirror 14 in lieu of a condenser lens provides only one surface for light loss where two or more surfaces would be introduced using a condenser lines. The parabolodial mirror also collects more light and serves to whiten the picture since it is treated so that it does not reflect the infra-red end of the spectrum. Also, glass surfaces are joined wherever possible to reduce light loss, and specifically the mounting of the condensing lens 15 directly against the entrance face of the prism eliminates two glass-air interfaces which would be present between lens 15 and prism 11 if lens 15 were spaced from prism 11.

Relay lens 18 also reduces loss of light since the glass-air interfaces are kept to a minimum and undue light diffusion is not permitted between the individual lenses in the relay lens system. Also, the relay lens is preferably tipped at an angle for correction of astigmatism as much as possible, while not unduly restricting passage of light therethrough. Thus, by reducing the number of reflective surfaces and interfaces and by keeping the incident of light impingement more perpendicular to reflecting surfaces and interfaces, it has been possible to improve illumination on the screen while minimizing the size of the light source, as well as the size and number of other components.

While the prism 11 may be comprised of relatively expensive high quality glass having a high index of refraction, it should be understood that where less than total depth-of-field correction is desired, the prism may be comprised of less expensive material such as a plastic having a lesser index of refraction. Where the prism is made of glass, protective plate 12 prevents chipping of the relatively expensive glass prism. In the event of damage to the plate, it may be removable as by dissolving the bond between the plate and the prism to permit reuse of the prism. If desired, the protective plate may be permanently attached to the prism without contemplation of removal as where the prism is of less expensive plastic protected by the plate against scratching. In an alternative form of the device, a prism of plastic material such as acrylic has been used with good results where the prism has an index of refraction of 1.49, angle A is 43 degrees, angle B is 62 degrees and angle C is 75 degrees.

We claim:

1. A projection system comprising a viewing screen, a light transmitting prism having an internally reflecting surface for receiving information to be transmitted, a light source, an optical means associated therewith for directing light into said prism through a surface other than said internally reflecting surface and through said prism to said internally reflecting surface and for transmitting the image reflected from said surface through said prism to said viewing screen, said optical means including projection means comprising a lens mounted between the prism and the viewing screen with its axis at an angle to the transmission path of light passing therethrough, said light source comprising an electric light bulb having a filament, said optical means including a parabaloidal mirror and a condensing lens for correcting the light beam into the prism with said light bulb disposed out of the beam of light; and said projection means comprising mirror means for directing light from the prism through said inclined lens, said inclined lens comprising a relay lens disposed to project the image upwardly without magnification to an elevated position above the heads of bowlers, a field lens at said elevated position for receiving the projected image from the relay lens, a projection lens near said position for projecting generally horizontally and focusing the image on the viewing screen and mirror means for directing the image from the field lens to the projecting lens, said field lens having a focal length to focus the image of the filament near the center of said projection lens.

2. A projection system comprising a light-transmitting triangular prism having three nonparallel surfaces defining a triangular cross section, said three surfaces being (1) an internally reflecting surface, (2) a light entry surface and (3) a light exit surface, a light source and optical means for directing light into the prism through the entry surface for reflecting the light from the reflecting surface and from the prism through the exit surface, and projection means including a lens in the path of light from said exit surface disposed across said path of light at an inclined angle sufficiently away from normal to the path of light in the direction of the angle of said internally reflecting surface to said path of light for correcting depth-of-field error without increasing astigmatism in the reflected image, said projection means directing the light away from further passage through a triangular prism, said surfaces (1) and (2) defining an angle A, surfaces (1) and (3) defining an angle B and surfaces (2) and (3) defining an angle C of the triangular cross section, angle A is sufficient to permit impinging of light internally at said reflecting surface at an angle greater than the critical angle of reflectivity at said reflecting surface, and angle B sufficiently larger than angle A to partially correct depth-of-field error in the transmittal image and sufficiently smaller than angle B' of the formula:

$$\tan B' = \frac{X^2 \tan A}{X^2 - 1 - \tan^2 A} = \frac{\sin 2A}{2\left(\cos^2 A - \frac{1}{X^2}\right)}$$

wherein X is the refractive index of the material of said prism, to eliminate appreciable astigmatism in the projected image.

3. The projection system of claim 2 wherein said prism is a glass prism having an index of refraction of about 1.65, angle A is about 42 degrees, angle B is about 57 degrees, angle C is about 81 degrees and the inclined angle of the lens is 7 to 8 degrees.

4. The projection system of claim 2 wherein said prism is made of plastic having an index of refraction of about 1.49, angle A is about 43 degrees, angle B is about 62 degrees, angle C is about 75 degrees, and the inclined angle of the lens is 7 to 8 degrees.

5. An apparatus for projecting an image of a legend to a viewing screen comprising a light-transmitting platen having generally parallel front and back surfaces, said front surface being arranged to support a sheet having a top surface accessible for intermittent progressive impression of a legend thereon and an opposed surface to which the legend is transferred when impressed on the top surface, a triangular prism, light transmitting cement means securing the triangular prism with one rectangular face in surface-to-surface contact with the back surface of said platen, means for continuously directing light through a second surface of said prism toward said opposed surface of the sheet to reflect an image of the opposed surface of the legend through the platen and prism, and means for continuously projecting the reflected image to a viewing screen so that the intermittently changing image is continuously projected without transmitting an image of the means which impresses the legend on the sheet and the prism is out of direct contact with the sheet and protected from contact by the legend impressing means.

6. The apparatus of claim 5 wherein said prism is of a plastic material normally susceptible to scratching and marring by the impressing means.

7. The apparatus of claim 5 wherein said prism is of optical glass normally susceptible to chipping or cracking by said impressing means.

8. The apparatus of claim 5 wherein said platen is vitreous and includes markings defining a permanent score-sheet image fired on the internally reflecting surface thereof.

9. An apparatus for projecting an image of a legend to a viewing screen comprising a light transmitting prism having an internally reflecting surface for receiving an image, a light source having a filament, optical means associated with said light source including a parabaloidal condensing mirror and a condensing lens for directing light into said prism through a surface thereof other than said internally reflecting surface and through said prism towards said internally reflecting surface and transmitting an image of said legend reflected through said prism to a viewing screen, and projection means comprising a non-magnifying relay lens, a field lens, mirror means and a projection lens spaced along the light path between said platen and said viewing screen, said condensing mirror and condensing lens focusing the image of said filament in the relay lens, and said field lens focusing the image of said filament in the projection lens so that the filament image is eliminated from the projected image.

References Cited

UNITED STATES PATENTS

| | | |
|---|---|---|
| 2,186,619 | 1/1940 | Sauer. |
| 2,310,273 | 2/1943 | Bancroft. |
| 2,397,027 | 3/1946 | Maurer. |
| 3,230,822 | 1/1966 | Wanielista. |
| 3,249,003 | 5/1966 | Byrd. |
| 3,249,004 | 5/1966 | Ullrich. |
| 3,269,259 | 8/1966 | Russell. |
| 2,813,455 | 11/1957 | Fitzgerald _____ 353—99 |

NORTON ANSHER, Primary Examiner

R. P. GREINER, Assistant Examiner

U.S. Cl. X.R.

353—44, 45, 81, 99